United States Patent
Rieschl et al.

(10) Patent No.: US 8,495,413 B2
(45) Date of Patent: Jul. 23, 2013

(54) SYSTEM AND METHOD FOR PROVIDING A COMPUTER STANDBY NODE

(75) Inventors: Michael John Rieschl, St. Paul, MN (US); Edward Stafford, North Oaks, MN (US); Thomas J. Bechtold, Forest Lake, MN (US); James R. McBreen, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 712 days.

(21) Appl. No.: 12/637,851

(22) Filed: Dec. 15, 2009

(65) Prior Publication Data
US 2011/0141882 A1 Jun. 16, 2011

(51) Int. Cl.
*G06F 11/00* (2006.01)
(52) U.S. Cl.
USPC ............................ 714/4.11; 714/13
(58) Field of Classification Search
None
See application file for complete search history.

(56) References Cited

U.S. PATENT DOCUMENTS

| | | | |
|---|---|---|---|
| 6,397,346 B1 * | 5/2002 | Cavanaugh et al. | 714/4.1 |
| 2003/0018927 A1 * | 1/2003 | Gadir et al. | 714/4 |
| 2005/0102549 A1 * | 5/2005 | Davies et al. | 714/4 |
| 2005/0268154 A1 * | 12/2005 | Wipfel et al. | 714/4 |
| 2007/0180288 A1 * | 8/2007 | Okada et al. | 714/4 |

* cited by examiner

*Primary Examiner* — Michael Maskulinski
(74) *Attorney, Agent, or Firm* — Richard J. Gregson

(57) ABSTRACT

An apparatus for providing a computing environment in a computing system includes a first node, a second node, an operations server, and a communication link. The first node is capable of supporting a production computing environment and has a first disk storage. The second node is capable of supporting a second operational computing environment, independent of the production computing environment and has a second disk storage. The operations server manages the first and second node and can switch the production computing environment from the first node to the second node. The communications link allows communication between the first node, the second node, and the operations server. The second node can take over the production computing environment from the first node upon a failure of the first node by providing the second node with access to the first disk storage and rebooting the second node from the first disk storage. A method of switching a production computing environment from a first node, having a first disk storage, to a second node in the event of a failure on the first node includes determining if the first node had a failure and if the first node had a failure: reassigning ownership of the partition definition to the second node; restoring communications configuration on the second node; and booting the second node from the first disk storage.

8 Claims, 3 Drawing Sheets

SYSTEM AND METHOD FOR PROVIDING A COMPUTER STANDBY NODE

TECHNICAL FIELD

The present disclosure relates to server systems, and in particular, the present disclosure relates to backup or redundant server systems.

BACKGROUND

Information technology systems are essential to any modern business. These systems have grown more and more complex and more and more expensive. Often, commodity-type systems are used to save money. These baseline commodity-type systems typically include a single node without the ability to create multiple partitions on the node. This is disadvantageous because if the node fails, the system is down until the node can be repaired or replaced.

For these and other reasons, improvements are desirable.

SUMMARY

In accordance with the following disclosure, the above and other problems are solved by the following:

In a first aspect, an apparatus for providing a computing environment in a computing system is disclosed. The apparatus includes a first node, a second node, an operations server, and a communications link. The first node is capable of supporting a production computing environment and has a first disk storage. The second node is capable of supporting a second operational computing environment, independent of the production computing environment and has a second disk storage. The operations server manages the first and second node and can switch the production computing environment from the first node to the second node. The communications link allows communication between the first node, the second node, and the operations server. The second node can take over the production computing environment from the first node upon a failure of the first node by providing the second node with access to the first disk storage and rebooting the second node from the first disk storage.

In a second aspect, a method of switching a production computing environment from a first node, having a first disk storage, to a second node in the event of a failure on the first node is disclosed. The method includes determining if the first node had a failure and if the first node had a failure: reassigning ownership of the partition definition to the second node; restoring communications configuration on the second node; and booting the second node from the first disk storage.

In a third aspect, an apparatus for providing a computing environment in a computing system is disclosed. The apparatus includes a first node, a second node, an operations server, and a communications link. The first node is capable of supporting a production computing environment and has a first disk storage controlled by a first operating system and a SAIL kernel disk controlled by a first SAIL kernel, wherein the first operating system cannot access the first SAIL kernel disk and the first SAIL kernel cannot access the first disk storage. The second node is capable of supporting a second operational computing environment, independent of the production computing environment, and has a second disk storage controlled by a second operating system and a SAIL kernel disk controlled by a second SAIL kernel, wherein the second operating system cannot access the second SAIL kernel disk and the second SAIL kernel cannot access the second disk storage, and wherein the second node cannot access the first SAIL kernel disk and the first node cannot access the second SAIL kernel disk. The operations server manages the first and second node and can switch the production computing environment from the first node to the second node.

The communications link allows communication between the first node, the second node, and the operations server. The second node can take over the production computing environment from the first node upon a failure of the first node by providing the second node with access to the first disk storage and rebooting the second node from the first disk storage.

DETAILED DESCRIPTION

Figure 1:
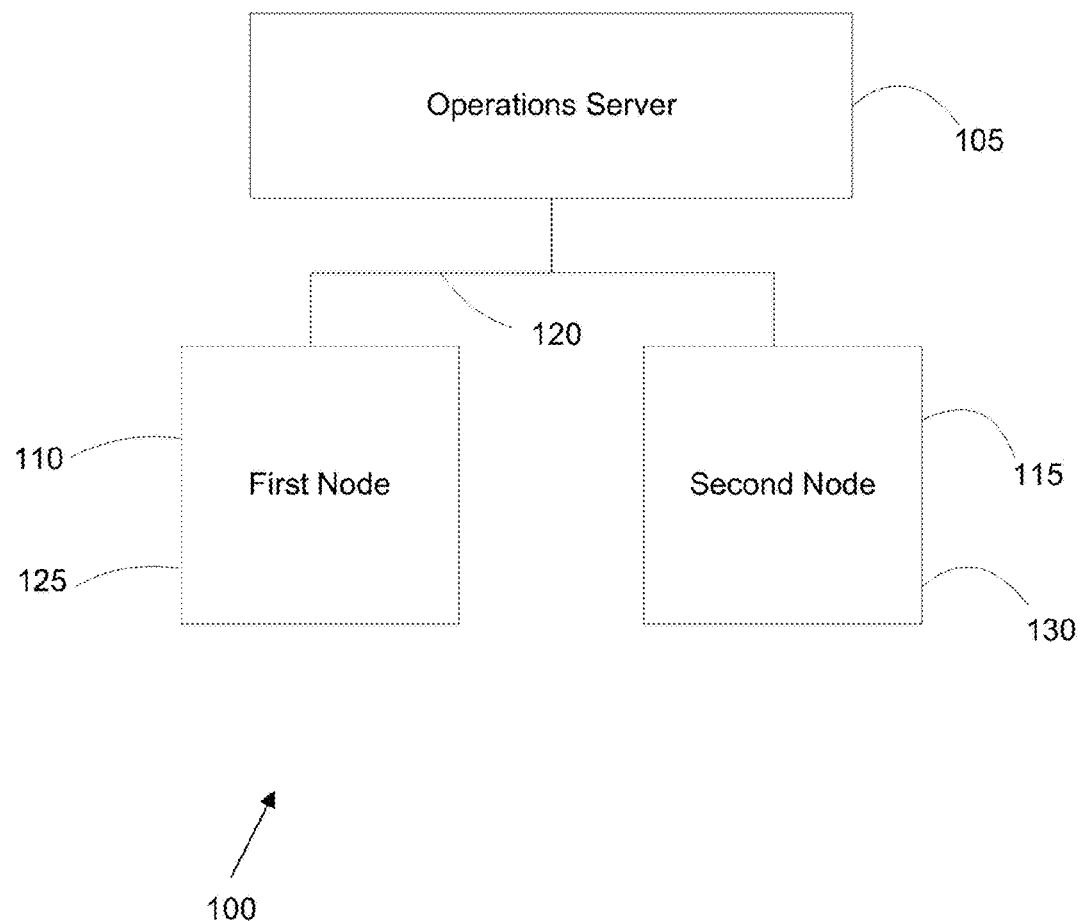
FIG. 1 is a block diagram of a computing system for providing a standby node, according to one possible example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to commodity-type computing systems that do not have multiple redundancies and backup components. A typical commodity-type system has a baseline configuration that includes a single cell or node. This single cell is referred to as a production node. The present disclosure includes adding a second node, or standby node to the computing system. Each of the production and the standby node is capable of supporting an operational environment independent of the other. The purpose of the second node is to be able to take over the production environment if the first node fails for any reason. Configuration and procedural actions must be taken in order for the second node to take over for the first node.

A system that includes a standby cell consists of two cells that operate independently and are managed as a single system by a single operations server. The system image enabler controls a single system with its single manufacture control number and two partitions. If the production cell fails, the standby cell is stopped. Access to all disk storage that is attached to the failed production cell is made available to the standby cell. The communications configuration from the failed production cell is then rebooted using the disk storage from the former production cell. The standby cell is now running as the OS production environment.

Referring to FIG. 1, FIG. 1 is a block diagram of an example operational system 100. Preferably, the system 100 includes an operations server 105, a first node 110, and a second node 115. The operations server 105, first node 110, and second node 115 communicate with each other via a communications link 120. Preferably, the first node 110 is a production node 125. The production node 125 is the primary node that substantially all operations run on. Preferably, the second node 115 is a standby node 130. The standby node 130 is a backup node that is able to take over production operations should the production node 125 fail for any reason. The standby node 130 can also be used for non-critical work (e.g. test and development) when it is not serving in the role of the production node.

An example operational system 100 is Mariner 1.7® by Unisys Corporation. The nodes are RD900® nodes that support an OS 2200® environment independent of each other. A Mariner 1.7® system supports a maximum of two nodes and only in a production and standby arrangement. Of course, any number of nodes could be utilized in different systems.

The operations server 105, or Server Management Control (SMC) software running on the operations server 105, manages the first and second nodes 110, 115. If the production node 125 fails, the operations server 105 stops the standby node 130. Access to all disk storage that may be attached to the failed production node 125 is made available to the standby node 130, and the communications configuration from the failed production node 125 is restored on the standby node 130. The operational environment running on the standby node 130 is then rebooted using the disk storage from the failed production node 125 and the standby node 130 is now running identically to the former production environment.

As used herein, a cell is defined as a single hardware component, including its associated firmware. A node is a single cell plus the input/output hardware, networking, etc. components, and their associated firmware that are connected to the cell. This collection of computing resources is under the control of a single instance of an operating system. A system is a collection of computing resources that are identified by a single Manufacturing Control Number (MCN).

Figure 2:
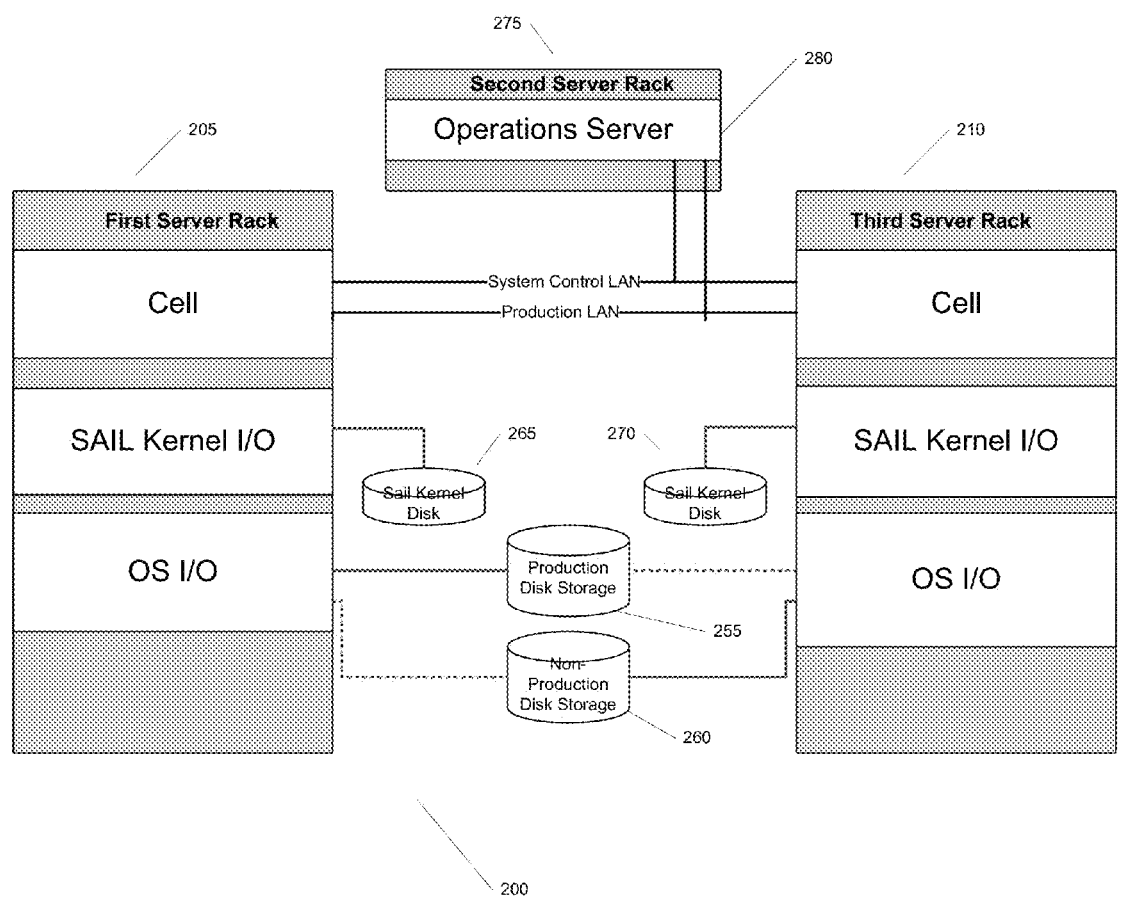
FIG. 2 is a block diagram of a computing system for providing a standby node, according to another possible example embodiment of the present disclosure.

Referring to FIG. 2, an example operations system 200 is illustrated. Preferably, the operations system 200 includes a first server rack 205, second server rack 210, and third server rack 275. In one example embodiment, the racks 205, 210, 275 are physically placed no more than 15 meters apart such that serial cables can be used to connect the first rack 205, second rack 210, and third rack 275 together for data transfer and control between the three.

Preferably, the first rack 205 includes a first cell 215, a first System Architecture Interface Layer (SAIL) kernel input/output (I/O) 225, and a first operating system (OS) I/O 230. A first node, e.g. the first node 110 of FIG. 1, could be considered to include the first cell 215, the first SAIL kernel I/O 225, and first OS I/O 230. Likewise, the second rack 210 includes a second cell 235, a second SAIL kernel I/O 245, and a second operating system I/O 250. A second node, e.g. the second node 115 of FIG. 1, could be considered to include the second cell 235, the second SAIL kernel I/O 245, and the second operating system I/O 250.

A cell typically includes at least one processor, a memory, a DVD drive, on-board network interfaces, and PCIe slots. A single operations server can be used to manage both the first node and the second node. The operations server 280 includes the Server Management Control (SMC) software that manages the OS environment and the underlying hardware and firmware (SAIL) platforms, including partitioning, initializing, booting, and maintaining the OS environment.

Preferably, the system 200 also includes a production disk storage 255 and a non-production disk storage 260 managed by the OS 230, 250, respectively. The disk storages 255, 260 are managed by the OS 230, 250 and connect through the storage IOPs (SIOP). SAIL cannot access the OS disks and tapes. The production disk storage 255 is preferably connected to the first rack 205. The non-production disk storage 260 is preferably connected to the second rack 210. In one example embodiment, the production disk storage 255 must be identical to the non-production disk storage 260. That is the number and location of IO expansion modules (JMR rack), the number and location of SIOPs (PCIOP-E), the number of PCI Channel Modules (GE racks), the type, number and location of HBAs, and the peripheral configuration must be identical. During switch-over, the second OS I/O 250 has access to the production disk storage 255, and the first OS I/O 230 has access to the non-production disk storage 260 as is indicated by the dashed lines in FIG. 2.

Preferably, the system 200 also includes a production SAIL kernel disk 265 and a non-production SAIL kernel disk 270. The OS 255, 260 cannot access these disks 265, 270. Instead these disks 265, 270 are accessed by the SAIL Kernel I/O's 225, 245, respectively. In one example embodiment, the communications hardware configuration must be identical for both nodes. That is the disk storage configuration including the style of the host bus adapter, number of controllers, disks, and interface; the number of I/O expansion modules, SIOP cards, and PCI channel modules, the communications hardware; and the number of network interface cards, PCI slots in which the NICS are installed, and the number of ports must be identical. The tape storage configuration should also be identical.

The SAIL kernel disk storage 265, 270 is unique to each node and access to the SAIL kernel disk storage 265, 270 is not switched when the roles of the first and second nodes are switched. In other words, when the standby node takes over for the production node, the standby node does not have access to the SAIL kernel disk 225 that was being used by the production node.

The hardware configuration of either node can include hardware in addition to that required to replicate the production configuration. The additional hardware is used by a node when it is running as a non-production OS host that is doing non-critical interruptible work. The partition definition used when a node is doing non-critical work contains only the hardware environment used while doing non-critical work, such that only critical work is switched over.

Both nodes 205, 210 run as separate and independent operational environments. The SMC manages these environments as a single system. Software controlled performance (SCP) is handled by initially designating the production cell as cell 0 and the MCN from this cell is used to validate image enablers and the SCN on both the production and standby nodes.

The entire communications network (system control LAN and production LAN) is managed by the SAIL kernel. However, generally, the OS network traffic utilizes one or more production LANs, and SAIL network traffic utilizes one or more system control LANs.

When the standby node takes over for the production node, the configuration of the production node's communication network must be restored on the standby node. In preparation for this event, a current backup of SAIL configuration data must be maintained while the production node is running Two new SAIL control center functions are created that facilitate the exportation and importation of just the Production LAN configuration data. An export must be done (using the new Export Settings for Standby function) after the production node is initially booted and after every configuration change. A SAIL configuration change is an infrequent event.

A change is made to the SAIL initialization process to not activate the communications ports associated with the production LAN. Activation of the production LAN can now be accomplished during the SMC start partition action. The System Control LAN communications ports (eth0 and eth1) continue to be activated during the SAIL initialization process. As a result of this change, if a customer supplies an NTP server it must be accessible from the System Control LAN.

The decision to switch the production workload to the standby node can be manual, via human intervention, or automatic depending on the configuration of the system. The decision to switch to the standby node will likely only be made upon confirmation of a hardware failure of the production node that prevents its reliable operation, i.e., software related failures are unlikely to trigger production switching to the standby node. When Server Management Control (SMC) makes the decision to switch the production workload to the standby node, a series of steps must be executed.

Figure 3:
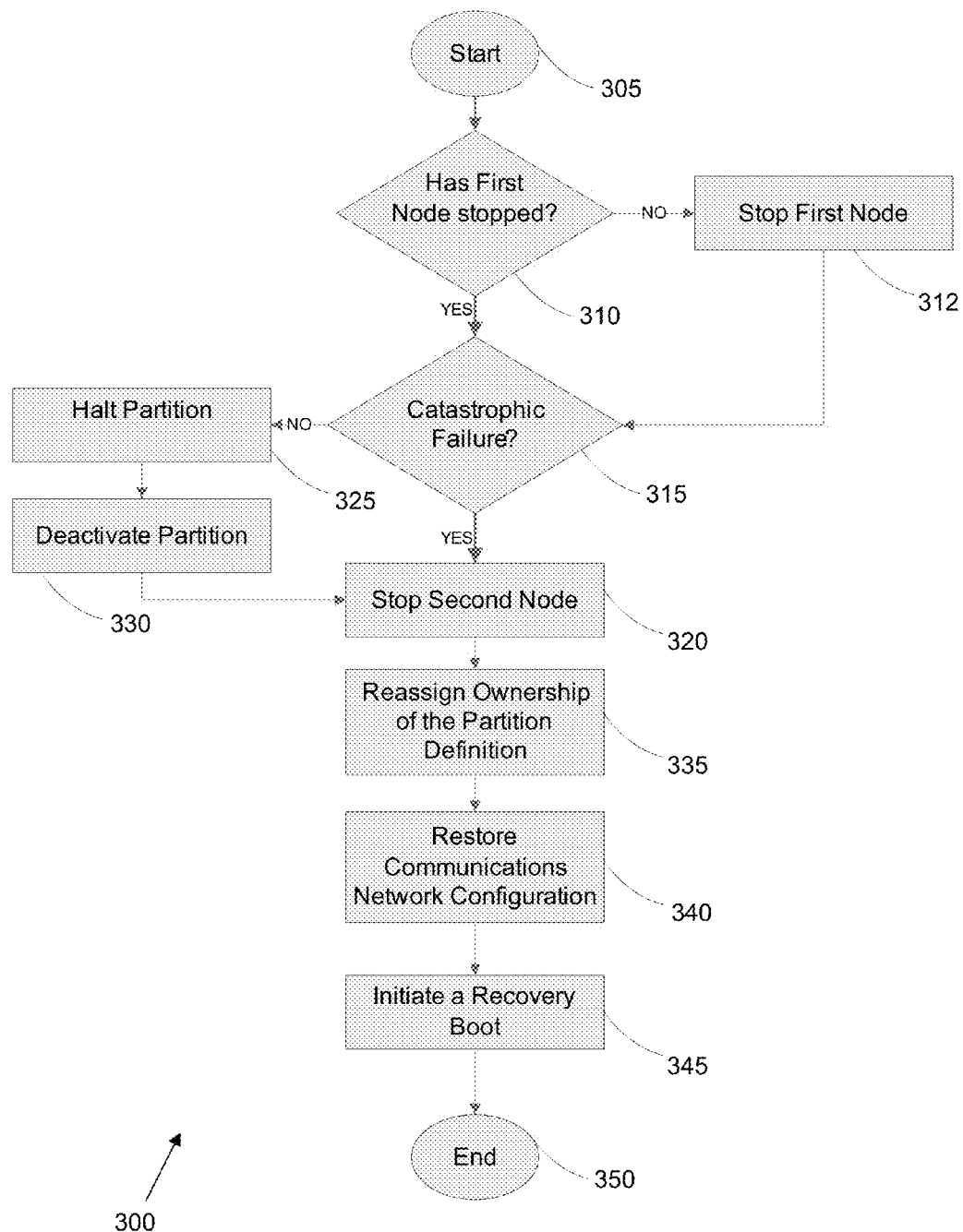
FIG. 3 is an operational flow diagram of a method for switching to a standby node, according to one possible example embodiment of the present disclosure.

Referring to FIG. 3, FIG. 3 is an operational flow diagram illustrating a method 300 of switching nodes. Operational flow begins at a start point 305. A first stop operation 310 determines if the first node, i.e. the first node 110 or production node 125 of FIG. 1, has stopped. If the first stop operation 310 determines that the first node has not stopped, operational flow branches "NO" to a first stop module 312. The first stop module 312 stops the first node. It is important that the first node be stopped to ensure that all I/O activity from the host to its peripherals has stopped and that communications traffic between the host and the production LAN has stopped. Operational flow proceeds to a failure operation 315. Referring back to the first stop operation 310, if the first stop operation 310 determines that the first node has stopped, then operational flow branches "YES" to the failure operation 315.

The failure operation 315 determines if there has been a catastrophic failure on the first node. If the failure operation 315 determines that there was a catastrophic failure, then operational flow branches "YES" to a second stop module 320. The second stop module 320 stops the second node, i.e. the second node 115 or standby node 130 of FIG. 1. This can be accomplished using SMC to do a Halt Partition on the second node.

If the event that triggered the need for a switch was not a catastrophic failure such that the first node is still powered up, then additional steps are required. Referring back to the failure operation 315, if the failure operation 315 determines that the event was not a catastrophic failure, then operational flow branches "NO" to a halt operation 325. When the partition is stopped, the OS I/O is also stopped. However, since the communication environment is managed by SAIL, a new interface between the SMC and SAIL is defined that will cause the production LAN to be deactivated whenever a partition is stopped. An operator or system administrator verifies that the partition and communications environment are stopped. The halt operation 325 halts the partition. A deactivate operation 330 deactivates the partition from the SMC. If the partition cannot be deactivated, then the cell is powered down from the SMC. If this cannot be accomplished, the cell can be powered down from the front panel, and finally, the cell can be powered down by removing the power cords from the cell. If the site personnel cannot determine the state of the partition and the communications environment, then power must be removed from the production cell. Operational flow proceeds to the second stop module 320.

A reassign operation 335 reassigns ownership of the partition definition for the production environment to the second node. A restore operation 340 restores the communications network configuration that was being used by the first node onto the second node. This can be accomplished using the SAIL Control Center Import Settings from the Standby interface of the second node to import the configuration that was exported while the production work load was being processed on the first node. A reboot operation 345 initiates a recovery boot. The SMC activates the partition that was previously running on the first node and performs an OS mass storage recover boot. At the completion of the recovery boot, the OS production workload is now being processed on the second node (now the production node).

Operational flow ends at an end point 340.

After the standby node is running the production workload using all of the OS disk storage that was available to the production node and using the communications network that the production node had been using, repair of the failed production node may be attempted. The failing component(s) of the production node is repaired or replaced. After repair, there are then three options. The production node can be tested prior to returning the production workload to the production node, the production workload can be immediately returned to the production node, or the production node can now be used as the standby node.

To test the production node prior to returning the production workload to it requires that the SAIL kernel and then the OS be booted. Assuming the disks were not replaced, the SAIL kernel disks will be the same ones that were in use the last time the production node was running. However, the communications network and disk storage that were used by the production node the last time it was active are now in use by the standby node. They must not be used for testing the production environment while the standby node is active. The first step is to boot the SAIL kernel on the production node. The changes dealing with activation of the production LAN that were described earlier ensure that no special actions are required for this boot.

The second step is to boot the OS (using SMC to activate and then start the test partition). If the standby node is active, the disk, tape and communications environment must be different from that currently in use on the standby node. This different hardware could be the environment that had previously been in use by the standby node while it was processing non-critical work or could be yet another unique set of hardware. A partition definition describing the unique test hardware environment must be available for activation.

Preferably, SMC has logic to prevent a given partition definition from being active on two nodes at the same time. After testing is complete, steps can be initiated to return the production workload to the production node. Once the production node has been repaired, the production workload may be returned to it. It may be that both nodes are actively running an OS environment, or it may be that the production node is stopped and the standby node is running an OS environment. If the production node is running, it must be stopped. This is accomplished using SMC to do a Halt Partition on the production node. Return of the production workload to the production node can be accomplished by following the same steps as described for switching from the production node to the standby node (except that now the standby node is acting as the production node).

The above description is advantageous because it provides the user with redundancy or backup that was not previously available. If the production node fails, the production environment can be readily moved to the standby node and production can continue on the standby node while the production node is repaired or replaced. The presently described methods and systems provide a high degree of availability of a production environment that was previously not available.

It is recognized that the above systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An apparatus for providing a computing environment in a computing system, the apparatus comprising:
    a first node capable of supporting a production computing environment and having a first disk storage controlled by a first operating system and a SAIL kernel disk controlled by a first SAIL kernel, wherein the first operating system cannot access the first SAIL kernel disk and the first SAIL kernel cannot access the first disk storage;
    a second node capable of supporting a second operational computing environment, independent of the production computing environment, and having second disk storage controlled by a second operating system and a SAIL kernel disk controlled by a second SAIL kernel, wherein the second operating system cannot access the second SAIL kernel disk and the second SAIL kernel cannot access the second disk storage, and wherein the second node cannot access the first SAIL kernel disk and the first node cannot access the second SAIL kernel disk;
    an operations server that manages the first and second node and that can switch the production computing environment from the first node to the second node; and
    a communications link between the first node, the second node, and the operations server;
    wherein the operations server can cause the second node can take over the production computing environment from the first node upon a failure of the first node by providing the second node with access to the first disk storage and rebooting the second node from the first disk storage.

2. An apparatus according to claim 1, wherein the operations server can stop the first node and the second node.

3. An apparatus according to claim 1, wherein the operations server can halt a partition on the first node and deactivate the partition.

4. An apparatus according to claim 3, wherein the operations server can reassign ownership of the partition to the second node.

5. An apparatus according to claim 4, wherein the operations server can restore a communications network configuration.

6. An apparatus according to claim 1, wherein the communications link includes a production local area network and a system control local area network.

7. An apparatus according to claim 1, wherein the first node includes a first cell.

8. An apparatus according to claim 7, wherein the second node includes a second cell.

* * * * *